(12) United States Patent
Mehrotra et al.

(10) Patent No.: US 8,307,014 B2
(45) Date of Patent: Nov. 6, 2012

(54) DATABASE REBALANCING IN HYBRID STORAGE ENVIRONMENT

(75) Inventors: Gaurav Mehrotra, Bangalore (IN); Abhinay Ravinder Nagpal, Bangalore (IN); Sandeep Ramesh Patil, Bangalore (IN); Rulesh Felix Rebello, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 12/862,931

(22) Filed: Aug. 25, 2010

(65) Prior Publication Data

US 2012/0054248 A1 Mar. 1, 2012

(51) Int. Cl.
*G06F 17/00* (2006.01)
(52) U.S. Cl. ........................................ 707/803; 707/692
(58) Field of Classification Search ........................ None
See application file for complete search history.

(56) References Cited

U.S. PATENT DOCUMENTS

| 6,269,375 | B1 | 7/2001 | Ruddy et al. |
| 2002/0174227 | A1 | 11/2002 | Hartsell et al. |
| 2007/0118689 | A1 | 5/2007 | Hyde, II et al. |
| 2007/0240161 | A1 | 10/2007 | Prabhakar et al. |
| 2008/0244178 | A1* | 10/2008 | Hyde et al. ..................... 711/114 |
| 2010/0061250 | A1 | 3/2010 | Nugent |
| 2010/0115216 | A1 | 5/2010 | Jia et al. |
| 2011/0320865 | A1* | 12/2011 | Jain et al. ..................... 714/6.22 |

OTHER PUBLICATIONS

"Solaris ZFS Enables Hybrid Storage Pools—Shatters Economic and Performance Barriers," Sun Microsystems, Inc. Oct. 2008; sun.com/openstorage.
Nitin Vengurlekar et al.; "Using Oracle Database 10g's Automatic Storage Management With EMC Storage Technology," Joint Engineering White Paper; Oracle; EMC2 where information lives; May 3, 2005.

* cited by examiner

*Primary Examiner* — Belix M Ortiz Ditren
(74) *Attorney, Agent, or Firm* — Elissa Wang; SVL;IP Law

(57) ABSTRACT

A method, computer program product, and system for rebalancing database table space in a hybrid storage environment of heterogeneous storage units used by a plurality of users to store associated extents. The storage units are ranked according to various performance characteristics such as IOPS rates and power consumption, and the users are ranked according to various characteristics such as whether they have subscribed to standard or premium storage subscriptions. Upon detection of a change in the relative ranking of the users or the storage units, the stored extents are mapped, characterized as standard or priority extents, and redistributed across the storage units if needed to provide higher ranked storage for priority extents and for higher ranked users.

25 Claims, 5 Drawing Sheets

DATABASE REBALANCING IN HYBRID STORAGE ENVIRONMENT

BACKGROUND

1. Technical Field

The present invention relates generally to hybrid storage environments, and more particularly to methods and systems for rebalancing databases in a hybrid storage environment.

2. Discussion of Related Art

In general, a data storage environment typically includes a single type of storage device and is connected to a host apparatus in order to store or read data in response to a command from the host apparatus, which may be an individual computer or a data server. Hybrid storage environments including a plurality of types of storage devices have recently been developed in order to increase storage capacity or data processing speed. However, when different types of storage devices are simply physically combined with one another in a hybrid storage environment, resources are likely to be wasted and the performance of the hybrid storage environment is likely to not be optimized.

BRIEF SUMMARY

Accordingly, embodiments of the present invention include a method, computer program product and a system for rebalancing databases in a hybrid storage environment used by a plurality of users that are ranked by user level and comprising a plurality of storage units that are ranked by performance level and are of at least two different storage types, comprising detecting a change in the ranking of one or more users or a change in the ranking of one or more storage units, in response to the detection, mapping a plurality of extents stored in the plurality of storage units, each of which extents is associated with an individual user in the plurality of users such that each user has a set of associated extents, where the mapping comprises determining in which individual storage unit each extent is stored, in response to the detection, characterizing each extent as a standard or priority extent by evaluating the user level of its associated user and one or more storage rules associated with the hybrid storage environment, in response to the mapping and characterizing, evaluating whether a redistribution of the plurality of extents is needed, and if yes, triggering a redistribution, and in response to the trigger, re-distributing the plurality of extents among the plurality of storage units using the one or more storage rules such that the priority extents associated with the highest ranked users are stored in the highest ranked storage units, and the standard extents associated with the lowest ranked users are stored in the lowest ranked storage units.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
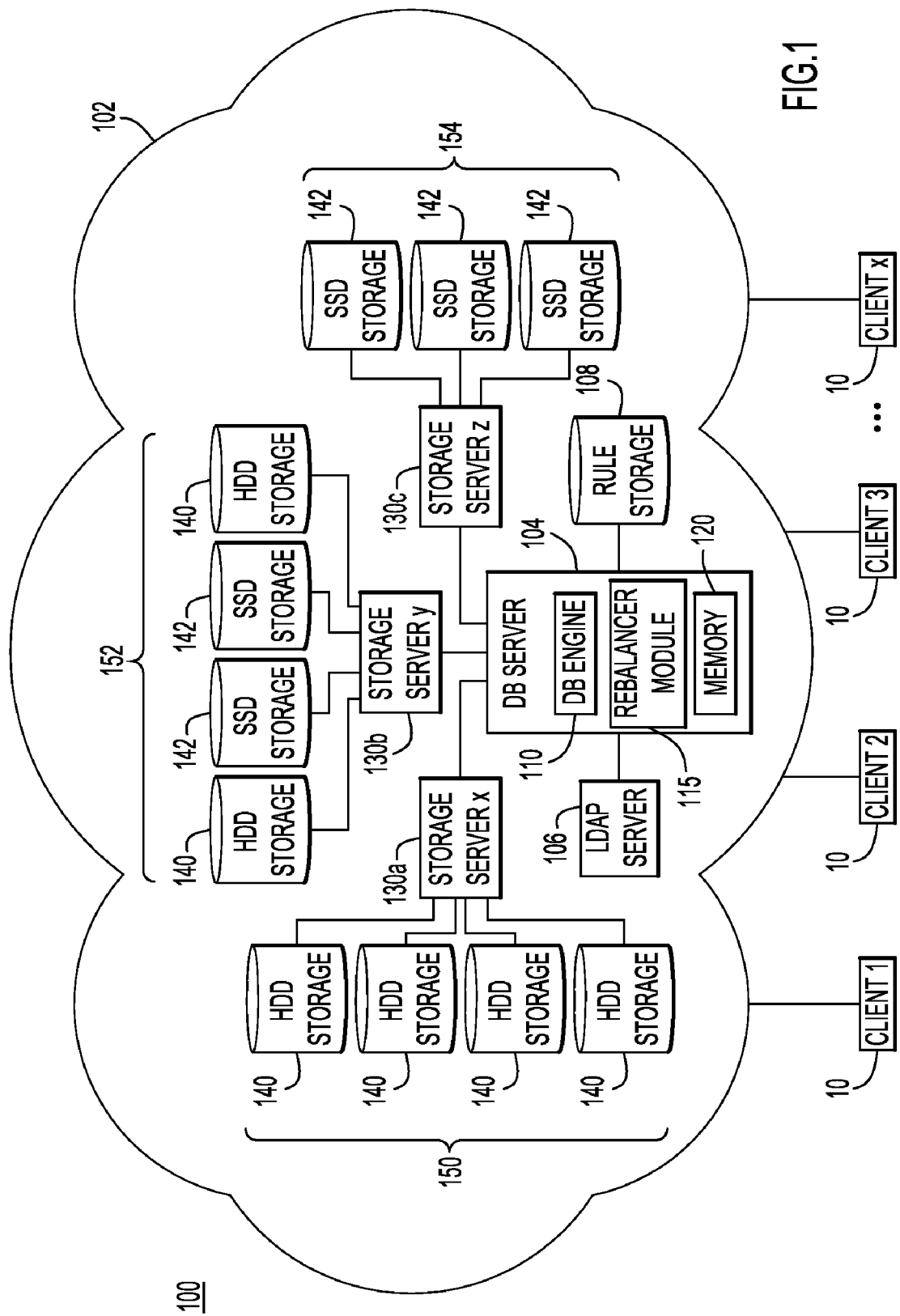
FIG. 1 is a block diagram illustrating an exemplary hybrid storage environment according to an embodiment of the present invention.

Referring now to the Figures, an exemplary computer system 100 comprising a hybrid storage environment 102 according to embodiments of the present invention is illustrated in FIG. 1. The hybrid storage environment 102 may be implemented in a cloud, data center, distributed network, storage area network (SAN), or in any other suitable system, for example in a system designed for the provision of Software-as-a-Service (SaaS), such as a cloud data center or hosted web service (e.g., a mail service such as Google Gmail).

The exemplary hybrid storage environment 102 comprises a database server 104 that is operatively coupled to an LDAP server 106 and rule storage 108, and comprises a database engine 110, a rebalancer module 115, and memory 120. The database server 104 may be any data management system suitable for use in a hybrid storage environment, for example, DB2®, Informix, LotusLive Notes, SQL Azure, etc. The LDAP server 106 manages directories for the database server 104, manages access to the directories by clients 10, and holds information regarding the users of the hybrid storage environment. For example, the LDAP server 106 can register databases and/or database servers, publish and distribute directory information, create and update directory entries, and direct client queries to the appropriate directory or database.

Rule storage 108 stores a number of storage rules, e.g., rules regarding the relative importance of the data stored in the hybrid storage environment and how to rank such data, rules regarding the performance characteristics of storage units in the hybrid storage environment and how to rank the storage units, rules regarding where different types of data are stored, rules regarding the relative ranking of users of the hybrid storage environment, rules regarding a user's ability to self-designate some of the user's associated data as priority data, etc. The stored rules are loaded from rule storage 108 into memory 120 as they are needed by the rebalancer module 115 to carry out the methods of the present embodiments. Rule storage 108 and memory 120 may be implemented by any conventional or other memory or storage device, and may be volatile (e.g., RAM, cache, flash, etc.), or non-volatile (e.g., ROM, hard-disk, optical storage, etc.), and include any suitable storage capacity.

The database server 104 is operatively coupled to multiple storage servers 130a, 130b, 130c, for example via a network. Data is stored in the storage servers 130a, 130b, 130c in any desired fashion, and may be implemented by any quantity of any type of conventional or other databases (e.g., network, hierarchical, relational, object, etc.) or storage structures (e.g., files, data structures, web-based storage, disk or other storage, etc.). Each storage server 130a, 130b, 130c comprises a set or plurality 150, 152, 154 of storage units such as hard disk drive (HDD) storage units 140 and solid state drive (SSD) storage units 142. While FIG. 1 displays a certain number of HDD storage units 140 and a certain number of SSD storage units 142, it is understood that the storage units may vary in number, arrangement and type, and are not limited to the particular depicted scenario.

The present embodiments are directed to a hybrid storage environment, in which the type or performance, or both, of the storage units is heterogeneous or hybrid. For example, the hybrid storage environment 102 comprises two or more different types of storage units, such as some HDD storage units and some SSD storage units, or two or more sets of storage units that differ in their performance characteristics, such that one set may be considered as high performance storage compared to the other standard performance set.

Exemplary types of storage units that may be used in the present embodiments include electromechanical hard drives (HDD) and solid state drives (SSD). Exemplary types of HDD storage units include Fibre Attached Technology Adapted (FATA) drives, Fibre Channel (FC) drives, Parallel Advanced Technology Attachment (P-ATA) drives (e.g., Integrated Drive Electronics (IDE) and Enhanced Integrated Drive Electronics (EIDE) drives), Serial-Attached SCSI (SAS) drives, Serial-Attached ATA (SATA) drives, and Small Computer System Interface (SCSI) drives. Exemplary types of SSD storage units include flash memory drives, DRAM drives, magnetic racetrack drives, and phase change memory (PCM) drives. The storage unit may also be a collection of drives, for example a RAID, a RAM cloud, a blade server comprising one or more solid state drives, or a blade center comprising one or more blade servers together with a blade chassis comprising common resources such as networking connections, input/output device connections, power connections, cooling devices, switches, etc.

Measurable performance characteristics that may be used to judge the performance level of a storage unit include the number of input/output operations per second (IOPS), damage resilience (e.g., ability to withstand temperature extremes), noise level, power consumption, fault tolerance, failure rate, controller speed, etc. Although each type of storage unit has a certain native performance level, this level may be enhanced by any suitable means, for example by security hardening the storage unit, adding an accelerator such as a cryptographic accelerator, compression accelerator, NAS accelerator, or the like. Generally, SSD storage units as a whole outperform HDD storage units because they generally have faster IOPS, higher damage resilience, lower noise levels, and lower power consumption. The different types of SSD storage units also differ in performance from each other, with flash memory typically being slower than DRAM or PCM memory. The high performance of SSDs, however, comes at a cost, because even the medium performance SSD storage units such as flash memory may be ten or more times the cost of lower performing HDD storage units for the same unit of capacity, and the higher performance SSD storage units may cost even more.

Generally, clients 10 provide a user interface to the functions provided by the hybrid storage environment 102, for example, access to a virtual database machine or application instantiated on the environment 102 or to database server 104, mechanisms for querying databases, updating or maintaining databases, manipulating data in the databases, etc. An administrator (e.g., database administrator, system administrator, or other privileged user) may also use a client 10 to administer and manage the hybrid storage environment 102.

The hybrid storage environment 102 may include additional servers, clients, and other devices not shown, and individual components of the system may occur either singly or in multiples, for example, there may be more than one database server in the system. The hybrid storage environment 102 may also be a node, for example a node in a computing cluster, which is connected to other nodes by suitable means, for example via a network. It is understood that any of the various components of the hybrid storage environment 102 may be local to one another, or may be remote from and in communication with one or more other components via any suitable means, for example a network such as a WAN, a LAN, Internet, Intranet, mobile wireless (e.g., GPRS, EDGE, 3G, 4G, etc.) etc.

Clients 10, database server 104, LDAP server 106, rebalancer module 115, and storage servers 130a, 130b, 130c may each be implemented in the form of a processing system, or may be in the form of software. They can be implemented by any quantity of conventional or other computer systems or devices (e.g., computer terminals, personal computers (e.g., IBM-compatible PC, Apple Mac, tablet, laptop, netbook, etc.), etc.), cellular telephones, personal data assistants (e.g., Palm Pre, Droid, iPhone, iPad, etc.), etc., and may include any commercially available operating system (e.g., AIX, Android, Linux, OSX, Sun Solaris, Unix, Windows, etc.) and any commercially available or custom software (e.g., browser software, communications software, word processing software, etc.). These systems may include processors, memories, internal or external communications devices (e.g., modem, network card, etc.), displays, and input devices (e.g., physical keyboard, touch screen, mouse, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

Figure 2:
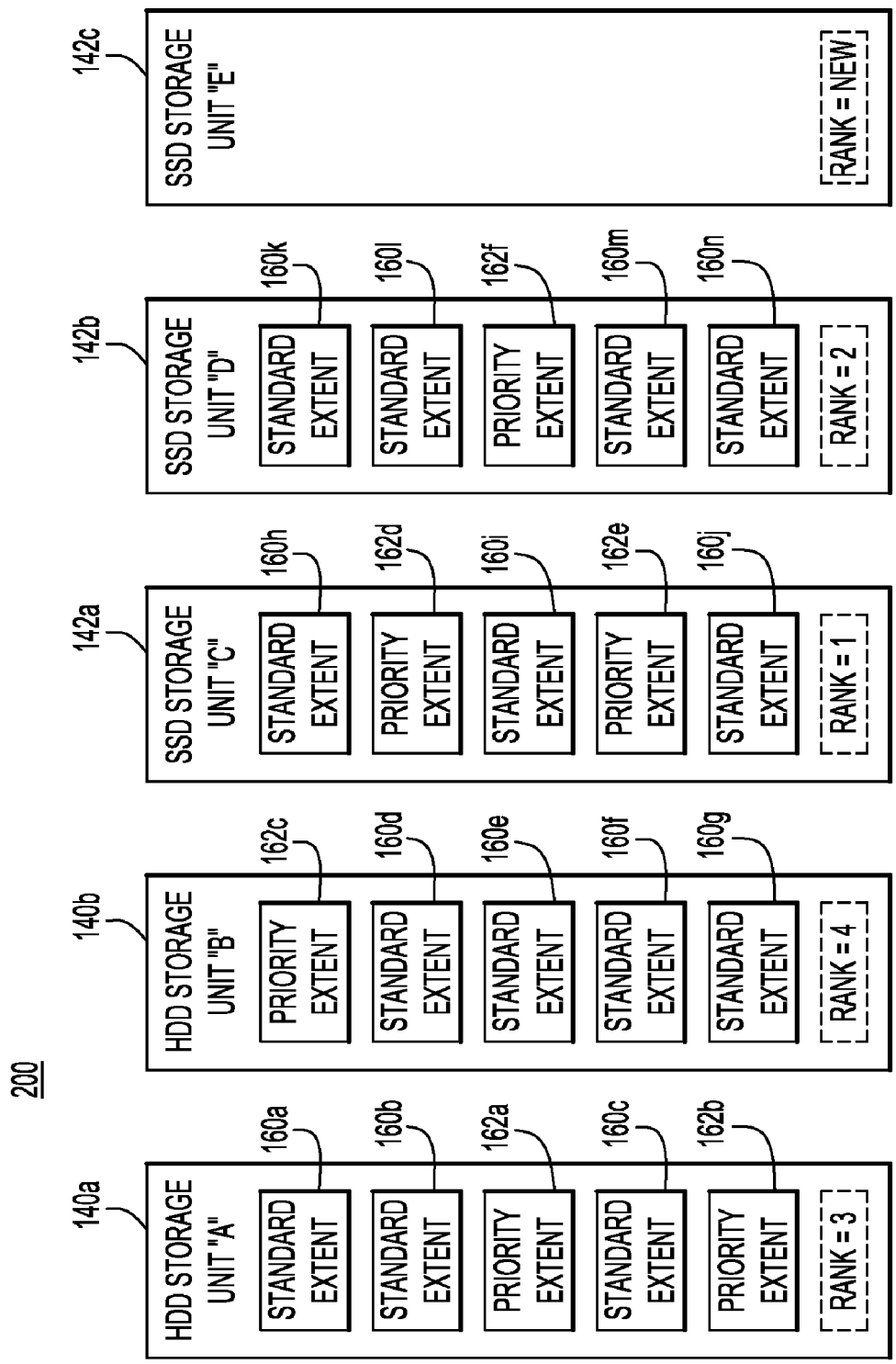
FIG. 2 is a block diagram illustrating an exemplary topology of a hybrid storage environment prior to rebalancing according to an embodiment of the present invention.
Figure 3:
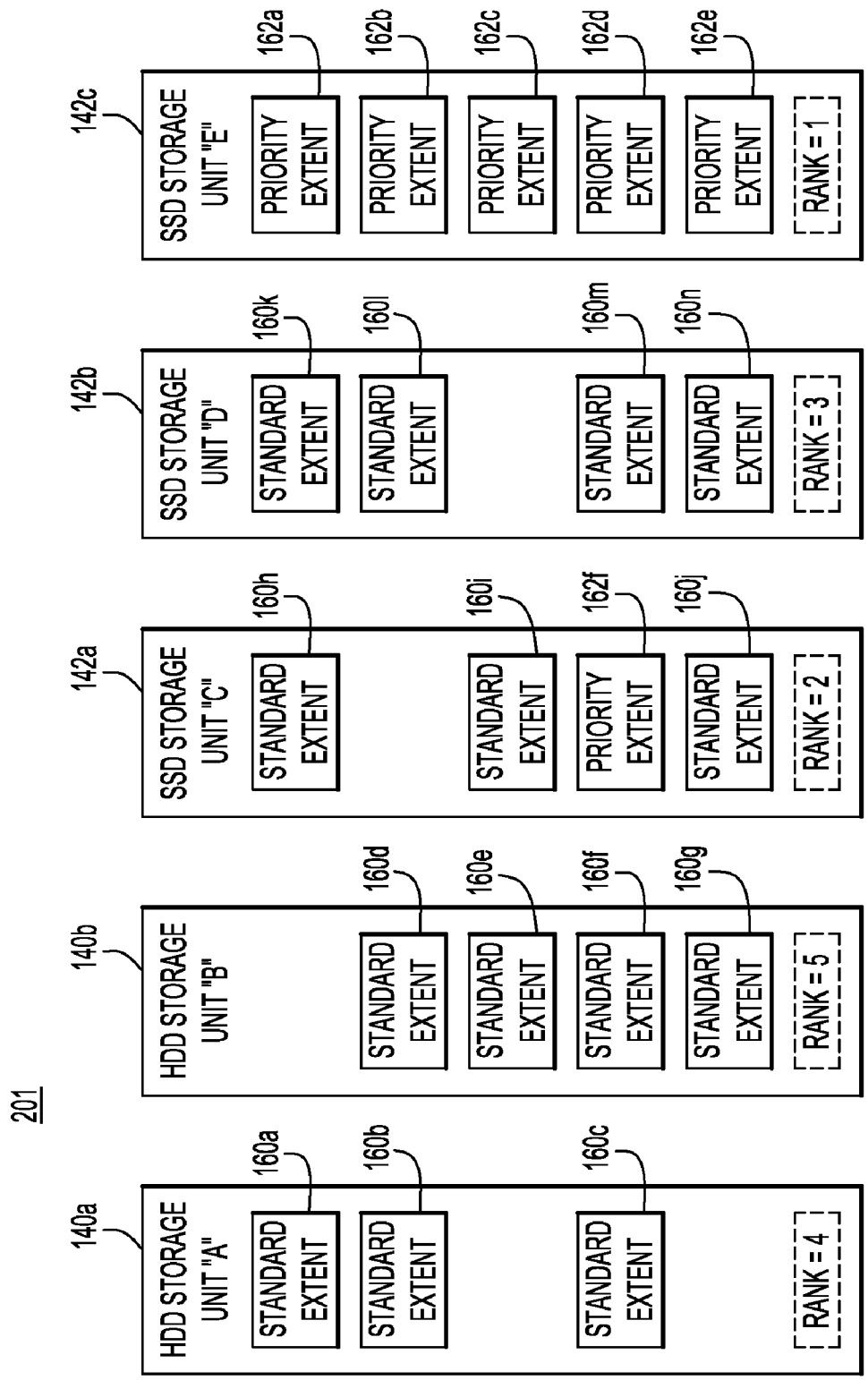
FIG. 3 is a block diagram illustrating an exemplary topology of a hybrid storage environment after rebalancing according to an embodiment of the present invention.

Referring now to FIGS. 2 and 3, the operation of the system that has been previously described may be understood by comparing the depicted topology 200 of the hybrid storage environment prior to rebalancing in FIG. 2 with the depicted topology of the hybrid storage environment after rebalancing in FIG. 3. As shown in FIGS. 2 and 3, and as previously discussed, the hybrid storage environment comprises a plurality of heterogeneous storage devices, illustrated here by exemplary HDD storage units 140a, 140b labeled as units "A" and "B", and exemplary SSD storage units 142a, 142b, 142c labeled as units "C", "D" and "E". As depicted, each storage unit has a number of standard extents 160a-n and priority extents 162a-f stored therein, and has been assigned a rank according to its performance level. Storage unit "E" 142c has been newly added at the time point depicted in FIG. 2 and thus has no extents stored therein prior to rebalancing.

An extent, as used herein, refers generally to an uninterrupted or contiguous allocation of physical data blocks, and is therefore a physical (as opposed to logical) unit of storage space. Each storage unit is capable of storing a certain number of extents depending on its physical storage capacity and the size of the extents, and although each storage unit is here depicted as storing only five extents in order to simplify the description of the systems, it should be understood that a conventional storage unit having, e.g., gigabyte, terabyte or petabyte storage capacity, may hold thousands, millions or more extents.

The term "priority extent" is used herein to indicate an extent storing data that is of higher importance than the average or low importance data stored in the "standard extent". It is understood, however, that although the extents have been referred to herein as either priority and standard, such binary reference is for ease of description, and the extents and their stored data may be ranked into multiple levels of importance that adds further granularity to the rebalancing methods of the present embodiments. The rebalancer module determines the relative importance of the stored data and extent in which it is stored by applying one or more storage rules to the data, and may also examine the data, e.g., by Deep Packet Inspection (DPI), querying statistics in system metadata, by identifying data with high read temperatures, etc. Depending on the particular implementation, the storage rules may designate extents as priority extents if they contain processor- or memory-intensive data (e.g., encrypted data or video data), "mission-critical" data (e.g., military communications, confidential emails, etc.), frequently accessed data (e.g., database indexes), data with high read affinities, or data designated by a user as priority data.

One or more of the storage rules may specify an algorithm by which the rebalancer module calculates the cost of storing or accessing particular extents in particular type of storage. A description of an exemplary algorithm follows. In the context of encrypted data, the rebalancer module first analyzes the query workload to find the various boundaries of the column being encrypted. A boundary is a value of the column which is used as a boundary of a query, and divide the column into regions called cells. If there are no boundaries, then the rebalancer module can either use all the distinct values in the cell (if that is small) or can divide the column into fixed number of cells of equal size. The COST matrix function computes the cost of executing the given workload on a particular storage unit and produces a cost matrix showing the cost and benefit information of all storage units. If a query accesses a partition, then it is assumed to access all the rows in the partition. Hence the cost of a partition is given by multiplying the respective entries in matrix A and B. The rebalancer module uses a recurrence relation is used to compute the best partition and its cost. The recurrence relation uses the COST matrix and it avoids repetitive computation of the same value. The cost of using fixed size buckets is also computed. This allows the selection of buckets which can be repetitive. This described algorithm in merely exemplary, and it is understood that there are other methods that may be used to compute the cost of executing the workload.

It is evident from an examination of the ranking of the storage units that the pre-existing database shown in FIG. 2 is not taking advantage of the performance advantages of the SSD storage units 142a, 142b, 142c when storing data. For example, three of the priority extents 162a, 162b, 162c are stored on the two lowest-ranked storage units "A" and "B", while numerous standard extents (e.g., 160h, 160i, and 160j) are stored on the highest-ranked storage unit "C". This distribution of data does not consider the advantages of the underlying storage technology, and thus does not optimize performance or environmental protection by storing important data on the SSD storage units, which outperform the HDD storage units (e.g., by having faster read performance times) and are also greener because their power consumption is lower than that of the HDD storage units.

The system of the present embodiments, and particularly the rebalancer module, corrects this inefficient usage of the hybrid storage environment by rebalancing the extents so that extents having important data stored therein (the priority extents) are stored on higher performing storage units (in FIGS. 2 and 3, the SSD storage units), and that extents having standard or low importance data stored therein (the standard extents) are stored on lower performing storage units (in FIGS. 2 and 3, the HDD storage units). The extents may also be stored depending on the type of data, for example a priority extent having high read affinity data stored therein may be placed on a certain higher performing storage unit, while a priority extent having encrypted data stored therein may be placed on a higher performing storage unit specifically designed for such data, e.g., a blade server operatively coupled to a cryptographic accelerator. This rebalancing enables faster data access, higher performance in accessing priority data, and an enriched end-user experience, all while optimally leveraging the usage of expensive high performance storage units.

The rebalancer module ranks the storage units based on their performance level by applying one or more storage rules that indicate what type and quality of performance is desirable in a given implementation of the hybrid storage environment. The rebalancer module may store and retrieve from storage the performance characteristics of the storage units, including their ranking, physical type, and various performance data (e.g., power consumption, IOPS rates, etc.). The rebalancer module may also analyze the underlying storage units, for example by using a system application programming interface (API) to query the storage units and/or storage servers, or for example by using Tivoli software to identify and classify storage units. When a new storage unit such as storage unit "E" 142c is added to the hybrid storage environment, the rebalancer module evaluates its performance level using the storage rules, and then updates the overall ranking of the storage units to account for the new storage unit. For example, with reference to FIGS. 2 and 3, it can be seen that new storage unit "E" 142c has been assigned the first place rank, and that the other storage units have each slid down a position in the overall ranking, for example storage unit "A" 140a moved from a rank of 3 in FIG. 2 to a new rank of 4 in FIG. 3.

The change in ranking of the storage units triggers the rebalancer module to map the extents stored in the storage units to determine in which individual storage unit each individual extent is stored. In response to this mapping, the rebalancer module evaluates whether a redistribution of the extents is needed by applying the storage rules. The storage rules may specify, for example, that priority extents should be stored in a high-ranked storage unit. If this is not the case, for example if priority extents are currently stored in low-ranked storage units, then a redistribution is needed and the rebalancer module triggers a redistribution, whereby the priority extents are physically moved to higher ranking storage units, and the standard extents are physically moved to lower ranking storage units. For example, in FIG. 3, priority extents 162a-e have been moved to the highest-ranked storage unit "E" 142c, from their original storage locations on the other storage units. Depending on the data management system, e.g., in a DB2 system, the rebalancer module may also update the table space map used to convert logical to physical page locations in order to account for the physical moves of the extents. The rebalancer module runs asynchronously in the background so that the data in the table space is still accessible to applications during the rebalancing methods.

Although the preceding example has discussed rebalancing based on the priority of the data, the rebalancing may also take the priority or ranking of users into account. For example, users may be assigned a user level based on storage characteristics such as their subscription level (e.g., premium and preferred users as compared to basic users), account level (e.g., enterprise user having multiple end-users as compared to an individual end user), user type (e.g., military or security users, government users, educational organizations, etc.), database entitlement, data service entitlement, account size, etc. The storage characteristics and any other user information is stored in, e.g., an LDAP directory managed by LDAP server 106. The rebalancer module uses the user level based on the storage characteristics and the storage rules to rank the users, either individually or in groups, where a higher level user is entitled to more high priority storage than a lower level user. For example, depending on the available storage space, the rebalancer module may direct the storage of the priority extents associated with the highest level users to be stored in the highest ranked storage units, and the standard extents associated with the lowest level users to be stored in the lowest ranked storage units.

Depending on the implementation of a particular system, there may be one or more storage rules permitting a user to designate a subset of his associated data extents as priority extents even if they would not otherwise be so considered, where the size of this permitted subset increases with increasing user level. A higher level user may also be able to designate the type of storage desired, for example premium users may subscribe to a green storage option in which they are entitled to store all or some of their data extents on lower power consumption storage units comprising SSDs. Or, for example, a higher level user storing vital customer data, for example a hospital or bank storing customer financial information, may desire to store vital data in an enhanced performance storage unit, such as a security hardened blade server, or a blade server comprising a cryptographic accelerator.

In a distributed model, the rebalancing process may be achieved by segregating transactions issued by premium customers: for example, the resource manager (RM) requires or accepts parameters to govern its operation or to identify a target resource domain; a string argument to xa_open( ) conveys this information. Transaction managers (TM) typically read the initialization string from a configuration file, i.e., the LDAP. The xa_open( ) routine, and the string form of its argument, support portability. A TM can give the administrator control over every run-time option that any RM provides through xa_open( ) with no reprogramming or relinking. Following this, the rebalancer module starts to execute. As the rebalancer module proceeds with the rebalancing, the tablespace map changes as shown in TABLE 1:

The rebalancer module is continuously monitoring changes in user or storage characteristics (as described with reference to FIGS. 5 and 6) to maintain optimal data balancing across the hybrid storage environment. It should be understood, however, that the rebalancing process 300 may also be triggered by other factors, for example the database application may trigger the rebalancing process because new data has been added to the hybrid storage environment, or to maintain data striping across containers.

The rebalancing inquiry begins in step 310, where the rebalancer module maps the currently stored extents to determine in which individual storage unit each individual extent is stored. The map identifies the precise physical location of each extent, for example on which disk in which storage unit connected to which storage server the extent is physically located. In step 315, the rebalancer module retrieves the storage rules for the system, for example from rule storage 108. In step 320, the rebalancer module obtains the performance characteristics of the storage units in the hybrid storage environment, for example by retrieving stored performance characteristics from storage such as rule storage 108 or another storage location, or by analyzing the underlying storage units via a system API and evaluating the performance characteristics as set forth in the storage rules. The obtained performance characteristics include a ranking of the storage units, either a complete relative ranking of all storage units, a breakdown of storage units into sets of comparable units such as a set of standard performance units and a set of enhanced performance units, or in another suitable manner.

Optional steps 325 and 330 may be implemented in certain systems as desired by the system administrators. If present, in step 325 the rebalancer module retrieves the current storage characteristics of the users of the hybrid storage environment, and in step 330 receives a user designation of priority extents associated with that user, for example directly from the user, or from a stored designation previously made by the user, etc.

In step 335, the rebalancer module characterizes the mapped extents as standard or priority extents using the storage rules, and if present the user storage characteristics and the user designation of priority extents. In step 340, the rebalancer module evaluates whether a redistribution of stored

TABLE 1

Tablespace Map:

| Range | MaxPage | MaxExtent | StartStripe | EndStripe | Adj | Containers |
|---|---|---|---|---|---|---|
| [0] | 5 | 2 | 0 | 0 | 0 | 4 (0, 1, 2, 3) |
| //encrypted data has been moved to partitions with better encryption facilities | | | | | | |
| [1] | 7 | 3 | 0 | 0 | 0 | 1 (3) |
| //data for premium customers is moved to SSD/racetrack | | | | | | |
| [2] | 2993 | 1496 | 1 | 498 | 1 | 3 (0, 1, 2) |
| [3] | 3361 | 1680 | 499 | 590 | 0 | 2 (0, 1) |
| [4] | 4309 | 2154 | 591 | 748 | 0 | 3 (0, 1, 3) |
| [5] | 5309 | 2654 | 749 | 998 | 0 | 2 (0, 3) |

Figure 4:
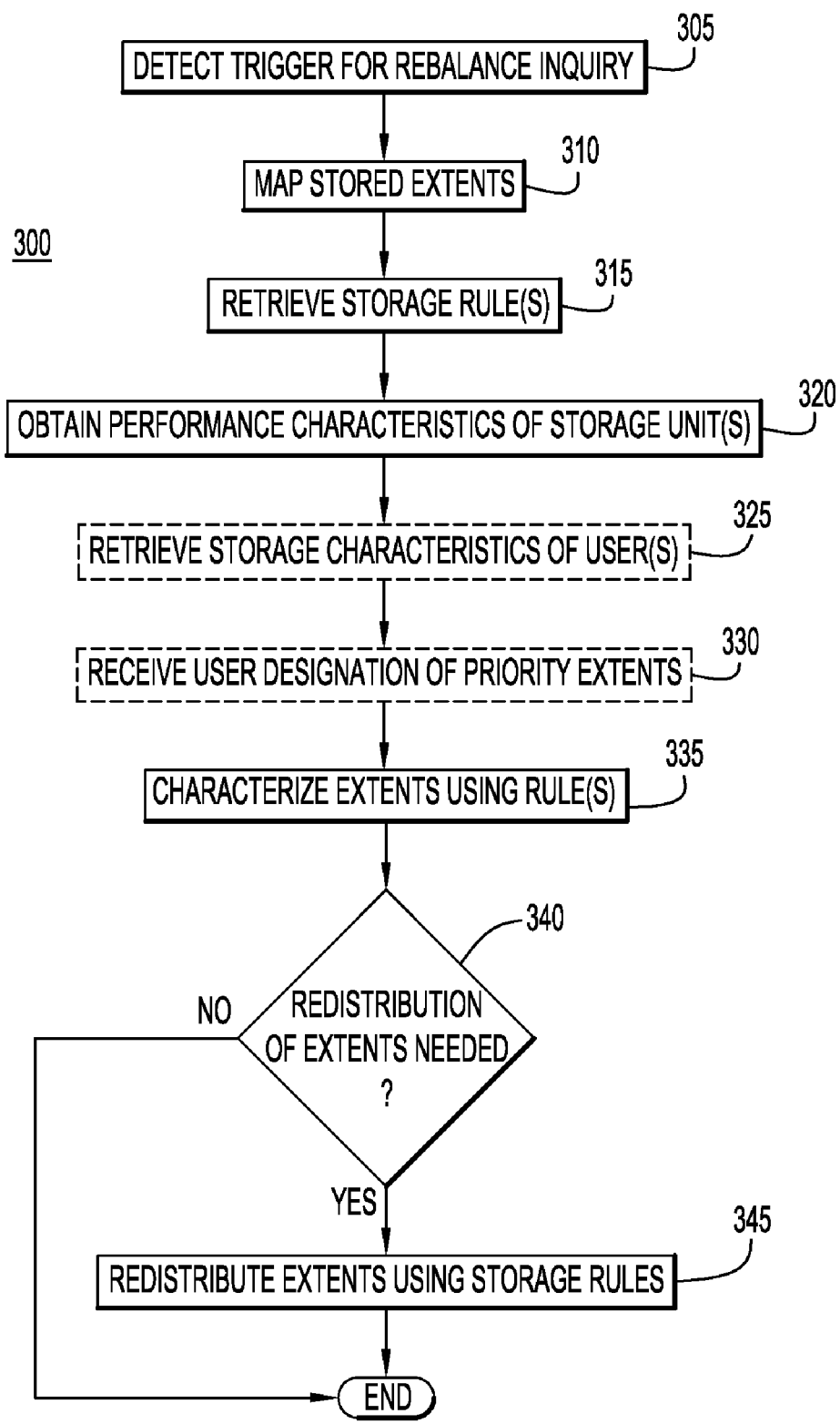
FIG. 4 is a flowchart depicting an exemplary method for rebalancing database extents in a hybrid storage environment according to an embodiment of the present invention.

Referring now to FIG. 4, the system that has been previously described, and particularly the rebalancer module 115 may perform the steps of FIG. 4, in which reference numeral 300 generally designates a flow chart depicting a method of rebalancing database extents in a hybrid storage environment according to an embodiment of the present invention. In step 305, the rebalancer module detects a trigger for a rebalance inquiry, for example by detecting a change in user ranking, a change in storage ranking, the addition or deletion of a storage unit from the system, a need for data striping to correct an imbalance in storage usage or input/output (I/O) load, etc.

extents is needed by applying the storage rules to the mapped extents, where the storage rules may specify for example that priority extents of premium users should be stored in the highest-ranked storage unit available, and that encrypted data of all users above a certain user level is to be stored in a storage unit with an associated cryptographic accelerator. If no redistribution is needed, then the process 300 ends. If a redistribution is needed, then in step 345 the rebalancer module directs a redistribution of the extents according to the storage rules, such that, e.g., the priority extents of higher ranked users are physically moved to higher ranking storage units, and the standard extents of lower ranked users are physically moved to lower ranking storage units. At this time any necessary updating to the internal table space map is also made so that the logical addresses for the extents match with their new physical locations. Then process 300 ends.

Figure 5:
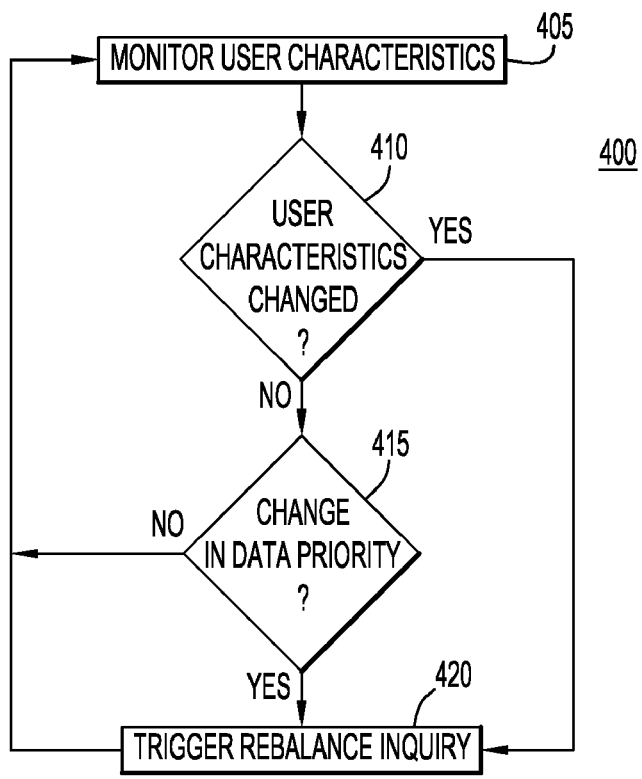
FIG. 5 is a flowchart depicting an exemplary method for monitoring the users and their associated data in a hybrid storage environment according to an embodiment of the present invention.
Figure 6:
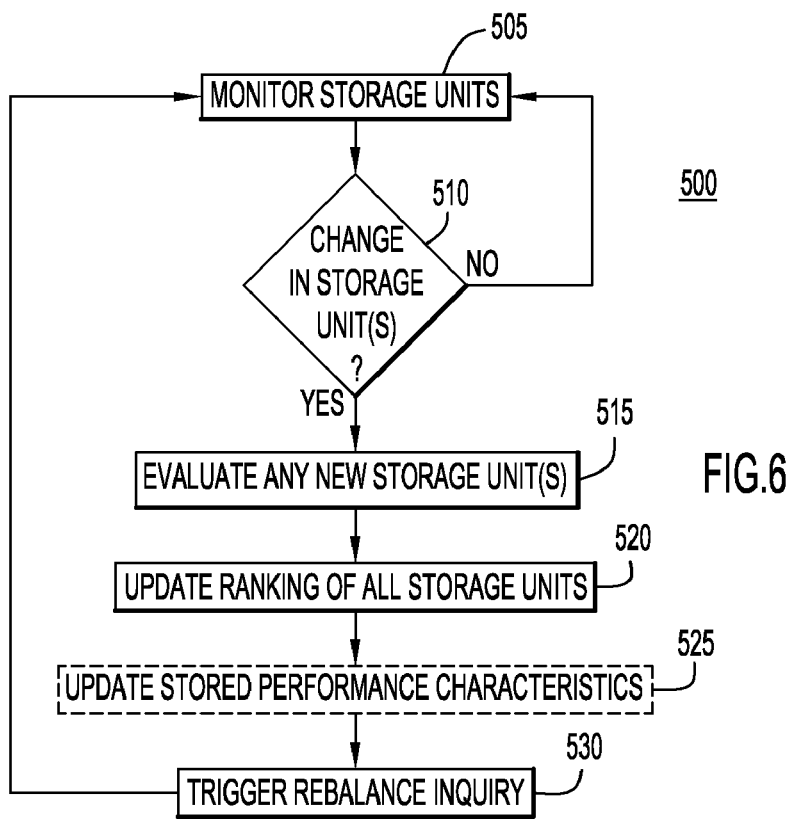
FIG. 6 is a flowchart depicting an exemplary method for monitoring the storage units in a hybrid storage environment according to an embodiment of the present invention.

FIGS. 5 and 6 represent additional processes that may occur prior to or concurrently with process 300. In FIG. 5, reference numeral 400 generally designates a flow chart depicting an exemplary method for monitoring the users and their associated data in a hybrid storage environment according to an embodiment of the present invention, that may be performed by the previously described system, and particularly the rebalancer module 115. The rebalancer module in step 405 monitors the storage characteristics of the users, and in step 410 determines if there is a change in the characteristics, for example if a user has upgraded or downgraded her subscription level. If yes, the rebalancer module triggers a rebalance inquiry in step 420, and then returns to step 405 to continue monitoring. If there is no change in characteristics, the rebalancer module in step 415 determines if there is a change in a user designation of priority data, and if yes, the rebalancer module triggers a rebalance inquiry in step 420, and then returns to step 405 to continue monitoring. If there is no change, then the rebalance module proceeds from step 415 to step 405 to continue monitoring. The trigger in step 420 sets off process 300 as described previously with reference to FIG. 4.

In FIG. 6, reference numeral 500 generally designates a flow chart depicting an exemplary method for monitoring the storage units in a hybrid storage environment according to an embodiment of the present invention, that may be performed by the previously described system, and particularly the rebalancer module 115. In step 505 the rebalancer module monitors the storage units, and in step 510 determines if there is a change in the storage units, such as the addition or removal of a storage unit, or a change in performance characteristics of one or more storage units. If there is no change, the process returns to step 505 to continue monitoring, but if there is a change, the rebalancer module in step 515 evaluates any new storage unit(s) that have been added to the system, for example by analyzing the new storage units via a system API or the like and evaluating their performance characteristics using the storage rules. In step 520 the rebalancer module updates the relative ranking of all of the storage units to account for any added or removed storage units, and any changes in performance characteristics. In optional step 525, if the performance characteristics are stored, the rebalancer module updates them in storage. Then, in step 530 the rebalancer module triggers a rebalance inquiry. The trigger in step 530 sets off process 300 as described previously with reference to FIG. 4.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for rebalancing database table space in a hybrid storage environment comprising:

detecting a change in storage characteristics of a first user in a hybrid storage environment comprising a set of standard performance storage units and a set of high performance storage units;

in response to said detection, mapping a first set of extents stored in the hybrid storage environment that are associated with the first user, wherein said mapping comprises determining in which set of storage units each extent in the first set is stored;

in response to said detection, characterizing each extent in the first set as a standard or priority extent by evaluating the storage characteristics of the first user and one or more storage rules associated with the hybrid storage environment;

in response to said mapping and characterizing, evaluating whether redistribution of the first set of extents is needed, wherein if priority extents in the first set are stored in the set of standard performance storage units then a redistribution of the first set of extents is triggered; and in response to said trigger, redistributing the first set of extents among the storage units using the one or more storage rules by moving priority extents stored in the set of standard performance storage units to the set of high performance storage units.

2. The method of claim 1, further comprising:
- determining that a new storage unit has been added to the hybrid storage environment;
- in response to said determination, classifying the new storage unit as a standard performance storage unit or a high performance storage unit; and
- in response to said classification, triggering said redistribution of the first set of extents.

3. The method of claim 1, further comprising:
- receiving a notification that an existing storage unit will be removed from the hybrid storage environment;
- in response to said notification, determining whether the existing storage unit belongs to the set of standard performance storage units or the set of high performance storage units; and
- in response to said notification, moving extents stored on the existing storage unit to another storage unit in the same set of storage units.

4. The method of claim 1, wherein the storage characteristics of the first user comprise a storage subscription level, and the change in the storage characteristics is a change to a higher storage subscription level.

5. The method of claim 1, wherein one of the one or more storage rules specifies that an extent having encrypted data stored therein is characterized as a priority extent, and wherein the enhanced performance storage units are blade servers comprising cryptographic accelerators.

6. The method of claim 1, wherein one of the one or more storage rules allows the first user to designate one or more extents in the first set as priority extents, and wherein the enhanced performance storage units are security hardened blade servers.

7. The method of claim 1, wherein the standard performance storage units are electromechanical hard drives, and the enhanced performance storage units are blades comprising one or more solid state drives.

8. A method for rebalancing database table space in a hybrid storage environment comprising:
- in a hybrid storage environment used by a plurality of users that are ranked by user level and comprising a plurality of storage units that are ranked by performance level and are of at least two different storage types, detecting a change in the ranking of one or more users or a change in the ranking of one or more storage units;
- in response to said detection, mapping a plurality of extents stored in the plurality of storage units, each of which extents is associated with an individual user in the plurality of users such that each user has a set of associated extents, wherein said mapping comprises determining in which individual storage unit each extent is stored;
- in response to said detection, characterizing each extent as a standard or priority extent by evaluating the user level of its associated user and one or more storage rules associated with the hybrid storage environment;
- in response to said mapping and characterizing, evaluating whether a redistribution of the plurality of extents is needed, and if yes, triggering a redistribution; and
- in response to said trigger, re-distributing the plurality of extents among the plurality of storage units using the one or more storage rules such that the priority extents associated with the highest ranked users are stored in the highest ranked storage units, and the standard extents associated with the lowest ranked users are stored in the lowest ranked storage units.

9. The method of claim 8, wherein said detection further comprises:
- detecting that a new storage unit has been added to the plurality of storage units;
- in response to said detection of the new storage unit, evaluating the performance level of the new storage unit to determine the new storage unit rank in the plurality of storage units; and
- in response to said evaluation of the performance level, updating the ranking of the storage units in the plurality of storage units to account for the new storage unit.

10. The method of claim 8, wherein said evaluation comprises determining that a redistribution is needed if one or more priority extents associated with the highest ranked users are stored in lower ranked storage units than one or more extents associated with the lowest ranked users.

11. The method of claim 8, wherein for each individual user, said redistribution comprises storing the user's priority extents in storage units with a higher ranking than the storage units in which the user's standard extents are stored.

12. The method of claim 8, wherein one of the storage rules allows a user to designate a subset of the user's set of associated extents as priority extents, and the size of the subset increases with an increase in the user's rank.

13. The method of claim 8, wherein one of the one or more storage rules specifies that an extent having encrypted data stored therein is characterized as a priority extent and is further designated to be stored on a storage unit comprising a blade server operatively coupled to a cryptographic accelerator.

14. The method of claim 8, wherein one of the storage rules specifies that a storage unit is ranked higher than another storage unit if has a higher number of input/output operations per second, and wherein at least one of the storage units of the plurality comprises a plurality of solid state drives.

15. The method of claim 8, wherein the storage types of the storage units are selected from the group consisting of electromechanical hard drives, flash memory drives, DRAM drives, magnetic racetrack drives, and phase change memory drives.

16. The method of claim 8, wherein one of the storage rules specifies that a storage unit is ranked higher than another storage unit if it has a lower power consumption rate.

17. A computer program product for rebalancing database table space in a hybrid storage environment comprising:
- a computer readable storage medium having computer readable program code embodied therewith, the computer readable program code comprising computer readable program code configured to:
  - in a hybrid storage environment used by a plurality of users that are ranked by user level and comprising a plurality of storage units that are ranked by performance level and are of at least two different storage types, detect a change in ranking of one or more users or a change in ranking of one or more storage units;
  - in response to said detection, map a plurality of extents stored in the plurality of storage units, each of which extents is associated with an individual user in the plurality of users such that each user has a set of associated extents, wherein said mapping comprises determining in which individual storage unit each extent is stored;
  - in response to said detection, characterize each extent as a standard or priority extent by evaluating the user level of each extent associated user and one or more storage rules associated with the hybrid storage environment;

in response to said mapping and characterizing, evaluate whether a redistribution of the plurality of extents is needed, and if yes, trigger a redistribution;

in response to said trigger, redistribute the plurality of extents among the plurality of storage units using the one or more storage rules such that the priority extents associated with the highest ranked users are stored in the highest ranked storage units, and the standard extents associated with the lowest ranked users are stored in the lowest ranked storage units.

18. The computer program product of claim 17, wherein said detection comprises the computer readable program code being further configured to:

detect that a new storage unit has been added to the plurality of storage units;

in response to said detection of the new storage unit, evaluate the performance level of the new storage unit using the one or more storage rules to determine the new storage unit rank in the plurality of storage units; and in response to said evaluation of the performance level, update the ranking of the storage units in the plurality of storage units to account for the new storage unit.

19. The computer program product of claim 18, wherein one of the storage rules specifies that a storage unit is ranked higher than another storage unit if has a higher number of input/output operations per second.

20. The computer program product of claim 18, wherein one of the storage rules specifies that a storage unit is ranked higher than another storage unit if the storage unit has a lower power consumption rate.

21. The computer program product of claim 17, wherein said evaluation comprises the computer readable program code being further configured to:

determine that a redistribution is needed and trigger a redistribution if one or more priority extents associated with the highest ranked users are stored in lower ranked storage units than one or more extents associated with the lowest ranked users.

22. The computer program product of claim 17, wherein the computer readable program code is further configured to:

receive a user designation of a subset of associated extents as priority extents, wherein the size of the subset increases with an increase in the user's rank.

23. A hybrid storage system comprising:

a plurality of storage units that are ranked by performance level and are of at least two different storage types selected from the group consisting of electromechanical hard drives, flash memory drives, DRAM drives, magnetic racetrack drives, and phase change memory drives, and having a plurality of extents stored therein, wherein each extent is associated with a user in a plurality of users that are ranked by user level such that each user has a set of associated extents; and a processor configured with logic to:

detect a change in ranking of one or more users or a change in ranking of one or more storage units;

in response to said detection, map the plurality of extents stored in the plurality of storage units by determining in which individual storage unit each extent is stored;

in response to said detection, characterize each extent as a standard or priority extent by evaluating the user level of each extent associated user and one or more storage rules;

in response to said mapping and characterizing, evaluate whether a redistribution of the plurality of extents is needed, and if yes, trigger a redistribution;

in response to said trigger, redistribute the plurality of extents among the plurality of storage units using the one or more storage rules such that the priority extents associated with the highest ranked users are stored in the highest ranked storage units, and the standard extents associated with the lowest ranked users are stored in the lowest ranked storage units.

24. The system of claim 23, wherein one of the one or more storage rules specifies that an extent having encrypted data stored therein is characterized as a priority extent and is further designated to be stored on a storage unit comprising a blade server operatively coupled to a cryptographic accelerator.

25. The system of claim 23, wherein one of the storage rules specifies that a storage unit is ranked higher than another storage unit if has a higher number of input/output operations per second, and wherein at least one of the storage units of the plurality is a blade server comprising a plurality of solid state drives.

\* \* \* \* \*